Oct. 4, 1966  R. R. RANDALL  3,276,290

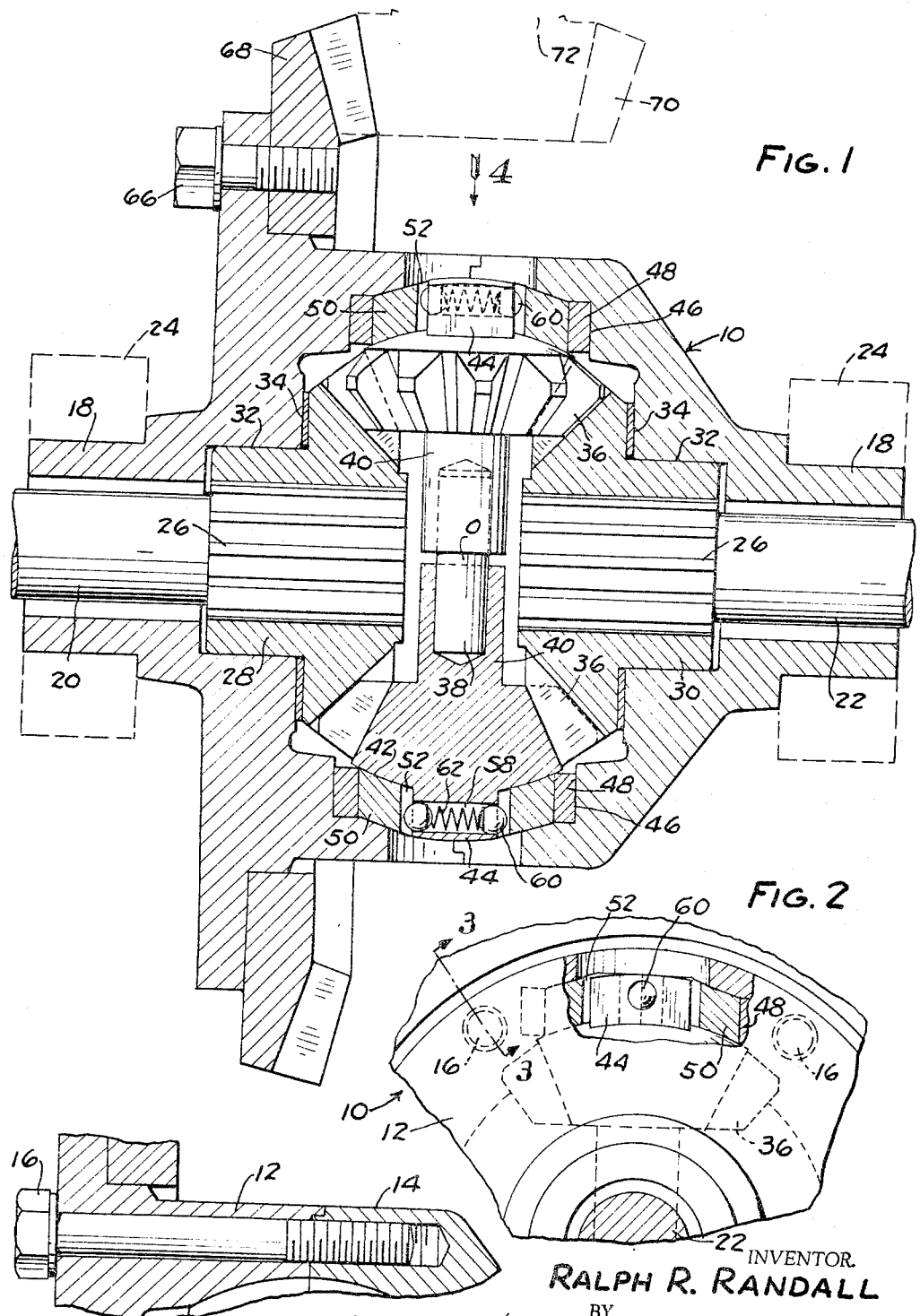

DIFFERENTIAL MECHANISM

Filed Jan. 29, 1964  3 Sheets-Sheet 2

INVENTOR.
RALPH R. RANDALL
BY
Barnes, Kisselle, Raisch & Choate
ATTORNEYS

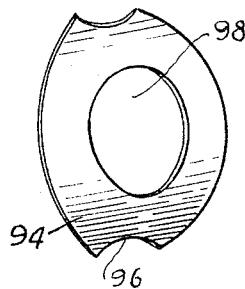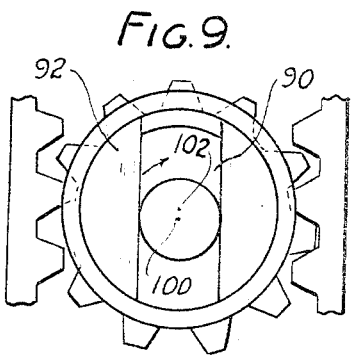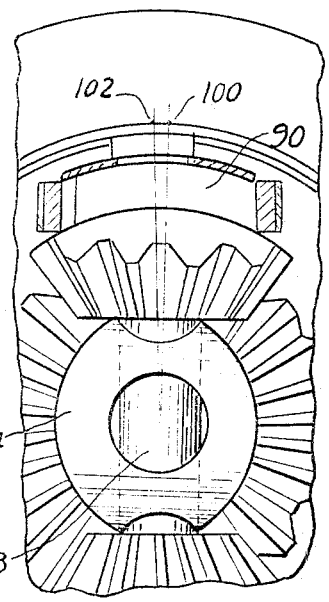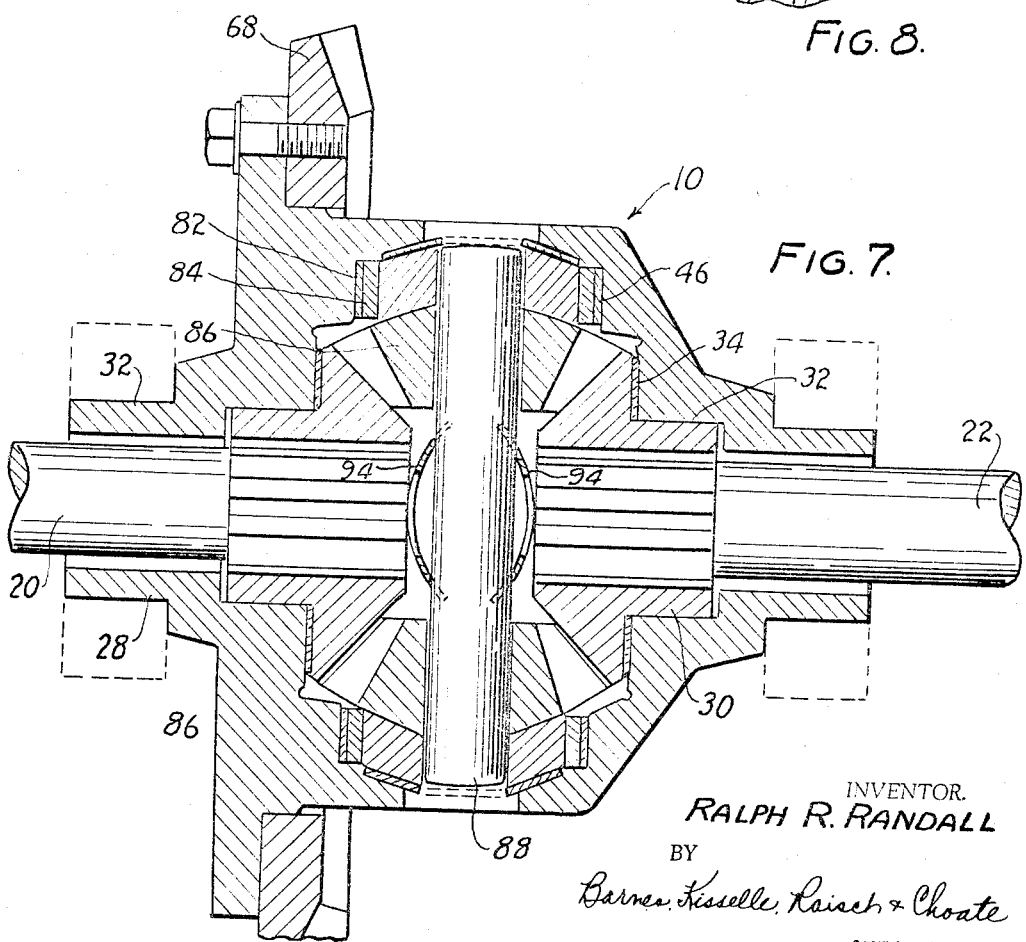

United States Patent Office 3,276,290
Patented Oct. 4, 1966

3,276,290
DIFFERENTIAL MECHANISM
Ralph R. Randall, Freeport, Ill., assignor to Dualoc Engineering Company, Rockford, Ill., a corporation of Illinois
Filed Jan. 29, 1964, Ser. No. 341,843
22 Claims. (Cl. 74—711)

This application is a continuation-in-part of my co-pending application Serial No. 261,353, filed February 27, 1963, now abandoned.

This invention relates to a differential mechanism and more particularly to a locking type differential for vehicles.

The conventional differential ordinarily used on such vehicles as automobiles and trucks is a relatively efficient device for transmitting torque to the driven wheels of the vehicle as long as the driving wheels have substantially equal traction. However, when the traction on the two driven wheels differs substantially with the conventional differential, the wheel having lesser traction has a tendency to spin while the other wheel remains stationary and the vehicle is therefore not propelled. This problem has been long recognized in the art of differentials and many differentials of the locking type have been proposed heretofore.

It is an object of the present invention to provide a locking type differential for the driven wheels of a vehicle that is of simple and economical construction and which, at the same time, is very effective to prevent wheel spinning and nevertheless permits differential action between the driven wheels readily when necessary.

In the drawings:

FIG. 1 is a cross-sectional view of a differential embodying the present invention taken along the wheel axis of the vehicle.

FIG. 2 is a fragmentary end elevational view of the differential with a portion broken away to illustrate details of the construction.

FIG. 3 is a sectional view along the line 3—3 of FIG. 2.

FIG. 7 is a cross-sectional view of a modified differential embodying the present invention.

FIG. 8 is a fragmentary sectional view of the differential shown in FIG. 7 and with portions broken away to illustrate details of construction.

FIG. 9 is a somewhat diagrammatic view illustrating the locking action of the modified form of the differential.

FIG. 10 is a perspective view of one of the spring retainers shown in FIG. 7.

Figure 4:
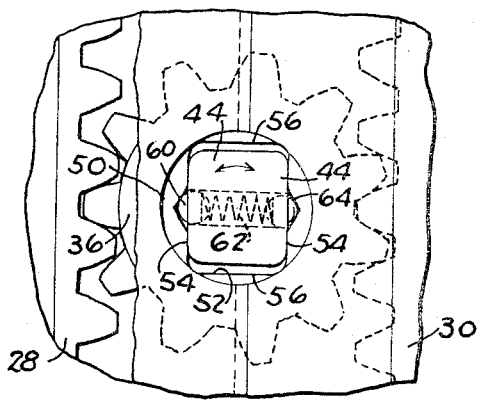
FIGS. 4 and 5 are somewhat diagrammatic views illustrating the locking action of the differential, FIG. 4 showing the unlocked and FIG. 5 the locked condition.

Referring to FIG. 1, the differential of the present invention includes a case 10 which, in the embodiments illustrated, comprises two half sections 12 and 14 secured together into an integral unit by bolts 16. The two half sections 12 and 14 of case 10 are fashioned with hubs 18 in which wheel axles 20 and 22 are journalled. Hubs 18 are adapted to receive bearings 24 by means of which case 10 is adapted to be journalled within an outer housing not illustrated. The inner ends of axles 20 and 22 are splined as at 26 for connection with a pair of axle gears 28, 30. The case sections 12 and 14 are fashioned with sockets 32 in which the hubs of axle gears 28, 30 are journalled and flat disc bearings 34 are provided for taking the side thrust of gears 28, 30.

The two axle gears 28, 30 are interconnected by a pair of axially opposed bevel pinion gears 36. Pinions 36 are in turn interconnected by a pin 38 which projects axially into axially extending hubs 40 on gears 36. As is illustrated in FIG. 1, pinion gears 36 intermesh with the axle gears 28, 30. The axis of rotation of pinions 36 is normal to and intersects the axis of rotation of axle gears 28, 30 at 0. Each pinion gear 36 has its axially outer end spherically shaped as at 42, the center being at point 0; and at the center of the spherically shaped surface 42, each pinion gear is fashioned with rectangularly shaped pin portion 44 which projects axially outwardly of the gear or, as stated differently, radially outwardly of case 10. Diametrically opposite portions of case 10 are formed with circular bearing sockets in which bushings 48 are press fitted.

Figure 5:
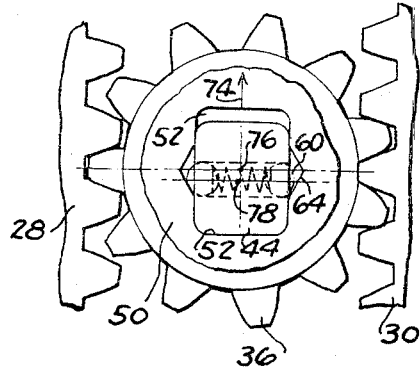

Within each bushing 48 there is arranged an annular bearing 50, the inner surface of which is spherical shaped to correspond with and engage the spherical surface 42 on pinions 36. Each bearing 50 is fashioned with a rectangularly shaped opening 52 into which the pins 44 project. As is shown in FIGS. 4 and 5, the openings 52 have side walls 54 which are spaced apart a distance corresponding to the width of pin 44. The end walls 56 of opening 52 are spaced apart a distance slightly greater than the length of pin 44 so that although the pin 44 engages opening 52 to form a rotating drive connection between each pinion 36 and its respective bearing 50, nevertheless, pin 44 is capable of shifting in one direction within bearing 50 so that its respective pinion 36 is disposed eccentric with respect to its associated bearing 50. Each pin 44 is fashioned with a cross bore 58 in which is arranged a pair of bearing balls 60 urged apart by a compression spring 62. The side walls 54 of opening 52 are fashioned with central V-shaped notches 64 in which the bearing balls are adapted to engage to yieldably retain the pinions 36 concentrically aligned with their respective bearings 50.

As is conventional, the case section 12 has secured thereto by screws 66 a driving ring gear 68 which is adapted to mesh with a bevel gear 70 on the drive shaft 72 of the vehicle.

Figure 6:
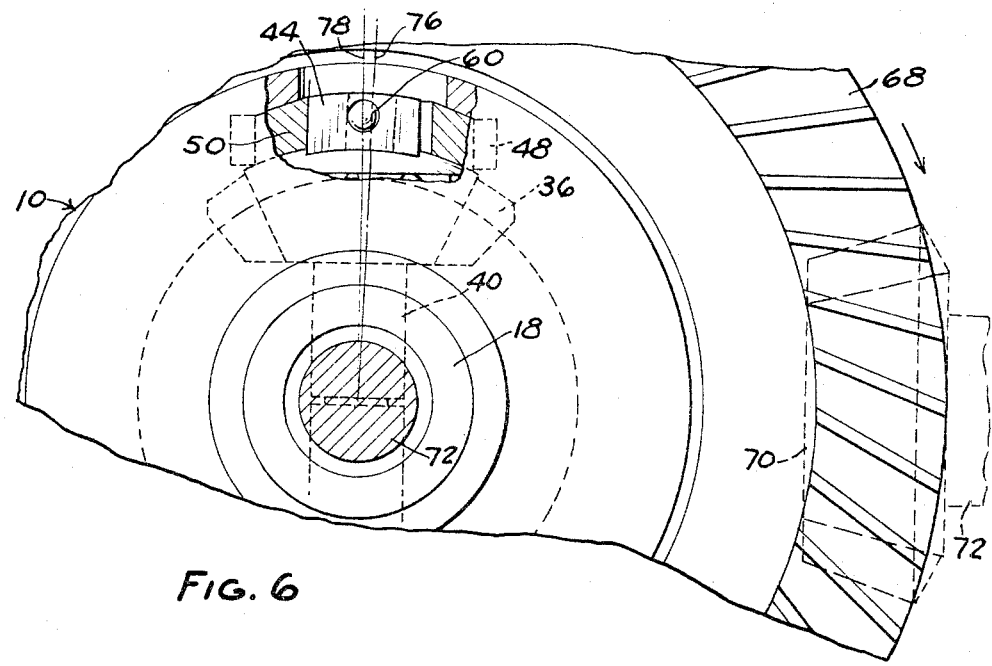
FIG. 6 is a fragmentary end view of the differential with a portion broken away and showing the differential in the locked condition.

In operation, the case 10 is rotatably driven about the axis of axles 20, 22 by the ring gear 68 meshing with the drive gear 70 on the drive shaft of the vehicle. Assuming that the vehicle is traveling a straight path and there is thus no need for any differential action between the two axles, the case 10 rotates and the pinions 36 are caused to revolve therewith by reason of the driving connection between these pinions and the case through the pins 44 and the annular bearings 50. If case 10 is rotating in the direction indicated by arrow 74 in FIG. 5, then, when the long dimension of pin 44 is parallel to the plane of rotation of case 10, pin 44 of each pinion 36 shifts rearwardly to the trailing side wall 56 of the openings 52 in each bearing 50. This is illustrated in FIGS. 5 and 6. In this position, it will be observed that the axis of rotation of each bearing 50 is at 76 while the axis of each pinion 36 is shifted to the position indicated at 78. Now, when the pinions 36 assume positions eccentric with respect to the bearings 50, it is obvious that the pinions 36 are prevented from rotating. Thus, pinions 36 are locked in position and the axle gears 28, 30 are thus caused to rotate as a unit with case 10. This condition obtains even though the traction on the two driving wheels connected with axles 20, 22 may differ very substantially. Both wheels are positively driven, wheel spinning is prevented, and the vehicle is propelled. With the differential in the locked condition illustrated in FIGS. 5 and 6, it will be appreciated that the power division will be such that the wheel with the greatest traction will receive the most torque.

The driving pinions 36 will remain in the locked condition until an external force is applied to these pinions which tends to cause them to rotate. This external force can be exerted on the driving pinions 36 only by the axle gears 28, 30. In turn, the only external torque that can be applied to the axle gears 28, 30 can result only from a required differential action between the wheels. Thus, if the pinion gears 36 are in a locked condition such as illustrated in FIGS. 5 and 6 and one of the driven wheels is forcibly compelled to rotate faster than the other, such as when the vehicle negotiates a turn or when one of the driven wheels rides over a bump, then the externally applied torque tends to rotate pinion gears 36. The externally applied torque to pinions 36 causes the projecting pins 44 to shift to the centered position in openings 52 shown in FIG. 4 where the bearing balls 60 engage in the V-shaped notches 64. However, as soon as the need for differential action between the wheels ceases, the two bearings 50 will again align themselves so that the long dimension of the openings 52 will be parallel to the plane of rotation of case 10; and the two pinions 36 will again drop back to the offset position shown in FIGS. 5 and 6 to thereby effect a locking of the differential.

As mentioned previously, when the differential is in the locked condition illustrated in FIGS. 5 and 6, the driving torque on the case 10 will be postively transferred to both wheels and thus prevent spinning even when the traction on the two wheels differs substantially. The power division between the two wheels will be distributed until such time as an external force is applied to the axle gears 28, 30. It therefore follows that with the differential of this invention, differential action is always obtained when required and the delivery of power to the wheel having greatest traction is assured irrespective of the fact that the traction of both wheels due to the condition of the road may differ widely. It has been established that the traction ratio between dry concrete and wet ice is about 14 to 1. The differential of this invention will remain locked even with such a large traction ratio between the two driven wheels.

Referring now to FIGS. 7 through 9, the differential shown therein differs somewhat from that shown in FIGS. 1 through 6 and represents another form embodying the present invention. In the form illustrated in FIGS. 7 through 9 the same numerals are used to designate those parts which are identical to the corresponding parts of the differential illustrated in FIGS. 1 through 6. In the modified construction within each circular bearing socket 46 there is arranged a wear sleeve 82 in which a bearing bushing 84 is retained. The opposed drive pinions 86 which mesh with the axle gears 28, 30 are journalled on a pin 88 which projects axially at its opposite ends into the two bearing sockets 46. Each pinion 86 is formed with an axially projecting, elongated bearing lug 90 on the outer end thereof. The lug 90 on each pinion has a length slightly less than the inner diameter of bushing 84. The lug 90 is centrally apertured to accommodate the end of pin 88. At each side of lug 90 there is arranged within bushing 84 a segment bearing 92. Bearing segments 92 are arranged to rotate within bushings 84 and the bushings in turn are capable of rotating in their respective sleeves 82.

Referring particularly to FIG. 7 there is arranged on opposite sides of pin 88 a pair of centering or retainer springs 94. These springs are generally oval shaped and in the form of a concave leaf spring. At each end springs 94 are faced with circular notch 96 which in the assembled condition engages the cylindrical surface of pin 88. Each spring 94 is also formed with a central aperture 98. In the assembled condition illustrated in FIG. 7 springs 94 are tensioned and are designed to develop a bilateral bearing pressure of about 100 lbs. per square inch on the axle gear bearings 34.

The operation of the differential shown in FIGS. 7 through 10 is in general similar to the operation described above with reference to the differential illustrated in FIGS. 1 through 7. However, in the arrangement illustrated in FIGS. 7 through 10, the leaf springs 94 exert outward pressure against the axle gears 28, 30 and this pressure has a tendency to resist relative rotation between the case 10 and the two axle gears 28, 30. Each spring 94 also introduces sufficient friction to resist free pivotal movement of pin 88 about the axis of gears 28, 30 as center, thus the tendency for the lug 90 to shift freely in a radial direction as illustrated in FIG. 9 is reduced. However, when both wheels are traveling a straight path the lug 90 will drop back to the position shown in FIG. 9 wherein the axis of each pinion 86, which is designated 100, is spaced from the center of rotation of bushing 84, which is designated 102. As explained previously above, in this condition each pinion 86 is eccentrically disposed with respect to its bushing 84 and the differential is thus locked. However, when one wheel is positively driven at a speed greater or lesser than the other, such as when the vehicle negotiates a turn or when one wheel rides over a bump, one of the axle gears 28, 30 is positively rotated. Under this condition springs 94 offer very little resistance to centering of pin 88 in bushing 84 and differential action occurs very readily.

Experience has shown that the arrangement illustrated in FIGS. 7 through 10 produces a locking action on the differential quite readily because of added friction between the case and the axle gears. At the same time, the ease with which differential action is obtained when necessary is not impaired.

One test for determining the efficiency and the operability of a locking type differential has been prescribed by the United States Army Ordnance Department. In this particular test, the differential is determined to be safe and effective when it has a power division sufficient to propel the vehicle forward or in reverse over a four inch obstacle when one of the driven wheels is on wet ice and the other driven wheel is on dry pavement without spinning the wheel on wet ice. In addition, to meet the government specification, the differential must be capable of negotiating a turn on a corner with the freedom of a balanced gear differential of conventional design. The differential of this invention passes this test satisfactorily.

I claim:

1. A differential mechanism comprising a rotatable case forming a driving member, a pair of spaced apart, axially aligned axle gears in the case journalled for rotation at the axis of rotation of the case, a pinion gear interposed between and meshing with each of said axle gears, said pinion gear having a projection thereon symmetrical to the axis of rotation of said pinion gear, said projection having a pair of parallel side faces which extend axially of said pinion gear, a circular bearing seat in the case into which said projection extends, bearing means journalled in said bearing seat and providing a non-circular opening in which said projection is engaged to provide a driving connection between said pinion and said bearing means, said opening being shaped to closely engage said parallel side faces of said projection and to permit a slight lateral shifting of the projection in the opening in a direction parallel to said side faces whereby when said projection shifts laterally in said opening and the pinion is in meshing relation with the axle gears, the pinion rocks to a position eccentric relative to said bearing seat to thereby lock the pinion against rotation in the case.

2. A differential mechanism comprising a rotatable case forming a driving member, a pair of spaced apart and axially aligned axle gears journalled in the case at the axis of rotation of the case, a pinion gear arranged between and meshing with the two axle gears and having its axis normal to and intersecting the axis of said axle gears, said pinion gear having a projection extending axially thereof, said projection having a pair of parallel side faces which extend axially of said pinion, said case having a bearing socket therein into which said projection extends, bearing means journalled in said socket, said bearing means providing an opening into which said projection extends, said opening being shaped to closely engage said side faces of said projection and cooperating with said projection to form a rotatable driving connection between said pinion and said bearing means, said opening being shaped to permit the projection to shift laterally in said bearing means in a direction parallel to said side faces to a position wherein the axis of the pinion is eccentric relative to said bearing socket, whereby when said projection shifts laterally to said eccentric position while the pinion is in meshing relation with said axle gears, the pinion is prevented from rotating and the axle gears are effectively locked to rotate with the case as a unit.

3. A differential mechanism as called for in claim 2 including a ring gear on the case concentric with the axis of rotation thereof and by means of which a rotating drive may be applied to the case.

4. A differential mechanism as called for in claim 2 including yieldable means biasing said projection to a position concentric with said bearing means.

5. A differential mechanism as called for in claim 2 wherein said axle gears are fixed in axially spaced relation and said pinion is radially fixed relative to said side gears.

6. A differential mechanism comprising a rotatable case forming a driving member, a pair of spaced apart, axially aligned axle gears in the case journalled for rotation at the axis of rotation of the case, a pinion gear interposed between and meshing with said axle gears, said pinion gear having a pin fixed thereto and projecting in a direction axially thereof, said pin being generally rectangularly shaped in cross-section, said case having a circular bearing seat, a bearing journalled in said bearing seat and providing a rectangularly shaped opening into which said pin projects, said pin and opening having generally the same dimension in one direction and the opening having a slightly greater dimension than the pin in another direction, whereby the pin and opening form a rotating driving connection between the pinion and the bearing and at the same time the pin is adapted to shift laterally in said opening relative to the bearing.

7. A differential mechanism as called for in claim 6 wherein said pin is formed integrally with said pinion.

8. A differential mechanism as called for in claim 6 wherein said opening is symmetrical about the axis of said bearing and said pin is symmetrical about the axis of said pinion.

9. A differential mechanism as called for in claim 6 including means for yieldably retaining said pin in a centered position within said opening so that the pinion is concentric with said bearing.

10. A differential mechanism as called for in claim 6 wherein two opposed side faces of the pin are in substantially coplanar engagement with two opposed side faces of said opening, one pair of said side faces being provided with notches and spring-biased detents projecting from the other pair of side faces for engaging in said notches.

11. A differential mechanism as called for in claim 6 including resilient means biasing said axle gears axially apart and into frictional bearing contact with said case.

12. A differential mechanism comprising a rotatable case forming a driving member, a pair of spaced apart, axially aligned bevel axle gears journalled in said case at the axis of rotation of said case, a pair of diametrically opposed bevel pinion gears arranged between and meshing with the two axle gears, said pinion gears each having a projection rotatably fixed thereon and extending axially thereof, each projection having a pair of axially extending, parallel side faces, said case having a pair of diametrically opposed circular bearing seats, an annular bearing journalled in each seat, said bearing forming an opening in its bearing seat into which said projections extend, said parallel side faces of said projections engaging said bearing openings to form a rotatable driving connection between each pinion and its associated bearing, said openings each having a dimension in a direction parallel to said parallel side faces greater than the corresponding dimension of said projection, whereby the projection is permitted to shift laterally in said opening relative to its bearing in a direction parallel to said parallel side faces such that when said opening is aligned with said dimension parallel to the plane of rotation of said case, said projections shift laterally in their respective openings to position the pinions eccentric with respect to their respective bearings and thereby effectively lock the axle gears to rotate as a unit with the case.

13. A differential mechanism as called for in claim 12 wherein said projections comprise pins which are generally rectangularly shaped and wherein said openings in said bearings are also generally rectangularly shaped.

14. A differential mechanism as called for in claim 12 wherein the axially outer end surface of each pinion is generally spherically shaped and the axially inner surface of each bearing is correspondingly shaped and in intimate engagement with said last-mentioned surface.

15. A differential mechanism as called for in claim 14 wherein the axis of rotation of said pinion gears intersects the axis of rotation of said axle gears and said generally spherically shaped surfaces are concentric with the intersection of said last two mentioned axes.

16. The combination called for in claim 12 including means for maintaining said pinion gears in axially aligned relation.

17. A differential mechanism comprising a rotatable case forming a driving member, a pair of spaced apart, axially aligned axle gears in said case journalled for rotation at the axis of rotation of the case, a pair of diametrically opposed pinion gears arranged between and meshing with the two axle gears, a pin extending axially between and interconnecting said pinion gears for revolution about said axle gears in unison, each pinion gear having a generally rectangularly shaped lug fixed thereto and projecting axially outwardly thereof, said case having a pair of circular bearing seats and a bearing journalled in each bearing seat and providing a rectangularly shaped opening into which said lug projects, each lug having a dimension in one direction corresponding closely to one dimension of said opening and having a close fit therein and each opening having a slightly greater dimension than its associated lug in another direction, whereby each lug and its associated opening form a rotating driving connection between each pinion and its associated bearing, and at the same time the two pinions are adapted to shift laterally relative to their associated bearings to a position wherein the axis of each pinion is slightly eccentric with respect to the axis of said circular bearing seats.

18. A differential mechanism as called for in claim 17 wherein each bearing comprises a pair of circular segments having chordal faces slidably engaging opposite faces of said lugs.

19. A differential mechanism as called for in claim 17 including resilient means acting between said pin and each of said axle gears and biasing said axle gears in a direction axially outwardly into frictional engagement with said case.

20. A differential mechanism as called for in claim 19 wherein said biasing means comprises a pair of leaf springs of arcuate shape, said springs being disposed on diametrically opposite sides of said pin with their opposite ends engaging said pin and with their central portions engaging the axle gears.

21. A differential mechanism as called for in claim 20 wherein said pin is cylindrically shaped and the ends of said springs are fashioned with circular notches for engaging the cylindrical surface of said pin.

22. A differential mechanism as called for in claim 21 wherein said pinion gears are rotatably mounted on the ends of said pin.

References Cited by the Examiner
UNITED STATES PATENTS

| | | | |
|---|---|---|---|
| 1,888,656 | 11/1932 | Boynton | 74—711 |
| 1,948,095 | 2/1934 | Boynton | 74—711 |
| 2,392,441 | 1/1946 | Wildhaber | 74—711 |
| 2,769,353 | 11/1956 | Nash | 74—711 |
| 2,841,037 | 7/1958 | Randall | 74—711 |

DAVID J. WILLIAMOWSKY, *Primary Examiner.*

J. A. WONG, *Assistant Examiner.*